(12) United States Patent
Bent et al.

(10) Patent No.: US 11,078,034 B2
(45) Date of Patent: Aug. 3, 2021

(54) CONNECTION FOR AN AGRICULTURAL VEHICLE

(71) Applicant: CNH Industrial Canada, Ltd., Saskatoon (CA)

(72) Inventors: Ethan Curtis Stephen Bent, Saskatoon (CA); Dennis W. Chahley, Saskatoon (CA); Gerard J. Gadzella, Saskatoon (CA); Ehsan Sharbati, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 44 days.

(21) Appl. No.: 16/525,177

(22) Filed: Jul. 29, 2019

(65) Prior Publication Data
US 2019/0389674 A1    Dec. 26, 2019

Related U.S. Application Data

(62) Division of application No. 15/626,921, filed on Jun. 19, 2017, now Pat. No. 10,414,603.

(51) Int. Cl.
    *B65G 53/46*      (2006.01)
    *A01C 23/00*      (2006.01)
    (Continued)

(52) U.S. Cl.
    CPC .............. *B65G 53/46* (2013.01); *A01C 7/08* (2013.01); *A01C 7/082* (2013.01); *A01C 7/20* (2013.01);
    (Continued)

(58) Field of Classification Search
    CPC ......... A01C 7/102; A01C 5/062; A01C 5/066; A01C 7/044; A01C 7/06; A01C 7/082; A01C 7/124; A01C 7/127; A01C 19/02; A01C 7/10; A01C 7/08; A01C 7/00; A01C 5/06; A01C 5/00; A01C 7/042; A01C 7/04; A01C 7/081; A01C 7/123; A01C 7/12; A01C 19/00; A01C 14/00; A01C 7/20;
    (Continued)

(56) References Cited

U.S. PATENT DOCUMENTS

| 3,268,251 A | 8/1966 | Troutner |
| 3,705,560 A | 12/1972 | Lappin |

(Continued)

FOREIGN PATENT DOCUMENTS

| DE | 8624982 U1 | 1/1987 |
| EP | 0761082 A1 | 3/1997 |

*Primary Examiner* — Christopher J. Novosad
(74) *Attorney, Agent, or Firm* — Rebecca L. Henkel; Rickard K. De Mille (57) ABSTRACT

An agricultural vehicle includes a chassis, a tank carried by the chassis, and at least one meter module coupled to the tank. The at least one meter module has at least one gate. A gate control link is coupled with the at least one gate of the at least one meter module. A control rod is carried by the chassis. A connector couples the control rod to the gate control link at a connection interface such that movement of the control rod controls an open state of the at least one gate of the at least one meter module. The connector has a frangible portion adjacent the connection interface; the control rod and the gate control link uncouples from one another upon a breaking force causing the frangible portion to break.

3 Claims, 11 Drawing Sheets

(51) Int. Cl.
*A01C 15/00* (2006.01)
*B65G 53/16* (2006.01)
*B65G 53/36* (2006.01)
*A01C 7/08* (2006.01)
*A01C 7/20* (2006.01)
*A01C 7/12* (2006.01)

(52) U.S. Cl.
CPC ............ *A01C 15/00* (2013.01); *A01C 15/005* (2013.01); *A01C 23/00* (2013.01); *A01C 23/007* (2013.01); *A01C 23/008* (2013.01); *B65G 53/16* (2013.01); *B65G 53/36* (2013.01); *A01C 7/124* (2013.01)

(58) Field of Classification Search
CPC ....... A01C 15/00; A01C 15/005; A01C 23/00; A01C 23/007; A01C 23/008; B65G 53/46; B65G 53/16; B65G 53/36
See application file for complete search history.

(56) References Cited

U.S. PATENT DOCUMENTS

| | | |
|---|---|---|
| 4,342,166 A | 8/1982 | Johnson et al. |
| 5,161,838 A | 11/1992 | Ely et al. |
| 5,567,096 A | 10/1996 | Howard |
| 6,240,861 B1 | 6/2001 | Memory |
| 6,406,074 B1 | 6/2002 | Mahaney |
| 6,606,956 B1 | 8/2003 | Paluch |
| 6,651,569 B2 | 11/2003 | Audigie |
| 6,834,599 B1 | 12/2004 | Fuessel et al. |
| 8,701,575 B2 | 4/2014 | Friggstad |
| 8,915,200 B2 | 12/2014 | Barsi et al. |
| 9,363,942 B2 | 6/2016 | Bent et al. |
| 9,516,799 B2 | 12/2016 | Olsen |
| 10,414,603 B2 * | 9/2019 | Bent ...................... A01C 15/00 |

* cited by examiner

CONNECTION FOR AN AGRICULTURAL VEHICLE

CROSS REFERENCE TO RELATED APPLICATIONS

This is a divisional non-provisional patent application based on U.S. patent application Ser. No. 15/626,921, filed Jun. 19, 2017, entitled "CONNECTOR FOR AN AGRICULTURAL VEHICLE," which is hereby incorporated by reference herein in its entirety.

BACKGROUND OF THE INVENTION

1. Field of the Invention

The present invention relates to agricultural vehicles, and, more particularly, to connectors for agricultural vehicles.

2. Description of the Related Art

Air carts are commonly used in agricultural applications. They are often towed behind an agricultural tilling implement, which in turn is towed behind an agricultural vehicle such as a tractor. The primary function of the air cart is to supply agricultural products such as seed, fertilizer, and/or herbicide to the tilling implement and subsequently to the field.

Air carts generally include a metering system which includes meter modules for dispensing material from one or more tanks and a pneumatic distribution system for delivering the material from the tank or tanks to the soil. In the case of multiple tanks, the tanks can be separate tanks, or a single tank with internal compartments. A centrifugal fan provides at least one airstream which flows through the pneumatic distribution system. Material is first introduced to the air stream by the metering system at a primary distribution manifold located below the metering system. Material is carried by the air stream through distribution lines to a series of secondary distribution manifolds, which in turn distribute the material through distribution lines to ground openers on the implement so that the product may be evenly delivered to the ground.

The individual meter modules of the metering system each generally include multiple channels which are opened and closed by a respectively associated internal gate, and may be identical in construction. The relative positioning of the internal gates, i.e., open or closed, of each meter module controls material flow through the meter module. To keep the relative material flow through each of the individual meter modules the same, some air carts are equipped with an externally accessible control rod which is coupled to a corresponding gate of each meter module by a respective control link. For example, a single control rod may be connected to a first gate of each individual meter module by respective control links connected to the control rod, so movement of the control rod will cause the first gate of each individual meter module to open or close. In such a configuration, an operator can easily adjust the material flow through multiple meter modules without needing to individually adjust the gates of each meter module.

One particular problem with such a configuration can occur when material inside the meter module obstructs the opening or closing of a gate. In such a scenario, the gate and associated control link are effectively stuck so movement of the control rod, such as rotation, acts as a shear force on the control link and gate. Many control rods are manually controlled by an operator, who may excessively push on the control rod in an effort to free up the obstruction in the meter module and inadvertently produce a shear force that can break the control link and/or gate.

In some air cart configurations, the control link is configured to act as a breaking point to protect the gates of the meter module, which are relatively difficult and time-consuming to repair compared to the control link due to being inside the meter module. In such configurations, each control link can be connected to an axle of the respective gate and rigidly connected to the control rod by a threaded shoulder bolt. When the force from the control rod becomes too great, the control link breaks to act as a fuse for the system and protect the control rod and connected gate from breakage. While such a solution can reliably protect the gates of the meter modules from breaking, all of the control links must be uncoupled from the control rod to replace a broken control link, which can be relatively time-consuming. For example, on an air cart with many meter modules, it can take 30 minutes or more to replace a single control link. Further, other control links may be damaged during the repair process due to over-torqueing of the shoulder bolts.

What is needed in the art is an agricultural vehicle which overcomes some of the previously described problems of known agricultural vehicles.

SUMMARY OF THE INVENTION

The present invention provides a connector with a frangible portion adjacent a connection interface between a gate of a meter module and a gate control link.

The invention in one form is directed to an agricultural vehicle including: a chassis; a tank carried by the chassis; at least one meter module coupled to the tank, the at least one meter module having at least one gate; a gate control link coupled with the at least one gate of the at least one meter module; a control rod carried by the chassis; and a connector coupling the control rod to the gate control link at a connection interface such that movement of the control rod controls an open state of the at least one gate of the at least one meter module, the connector having a frangible portion adjacent the connection interface, the control rod and the gate control link uncoupling from one another upon a breaking force causing the frangible portion to break.

The invention in another form is directed to a metering system for an agricultural vehicle including: at least one meter module having at least one gate; a gate control link coupled with the at least one gate of the at least one meter module; a control rod; and a connector coupling the control rod to the gate control link at a connection interface such that movement of the control rod controls an open state of the at least one gate of the at least one meter module, the connector having a frangible portion adjacent the connection interface, the control rod and the gate control link uncoupling from one another upon a breaking force causing the frangible portion to break.

An advantage of the previously described agricultural vehicle is the connector can be a relatively simple and inexpensive part to replace.

Another advantage is the connector can be placed in aligned respective openings of the gate control link and control rod such that a broken connector can be replaced simply by pushing a replacement connector through the aligned openings without needing any tools.

Yet another advantage is the breaking force required to break the frangible portion can be controlled by adjusting the structure of the frangible portion.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
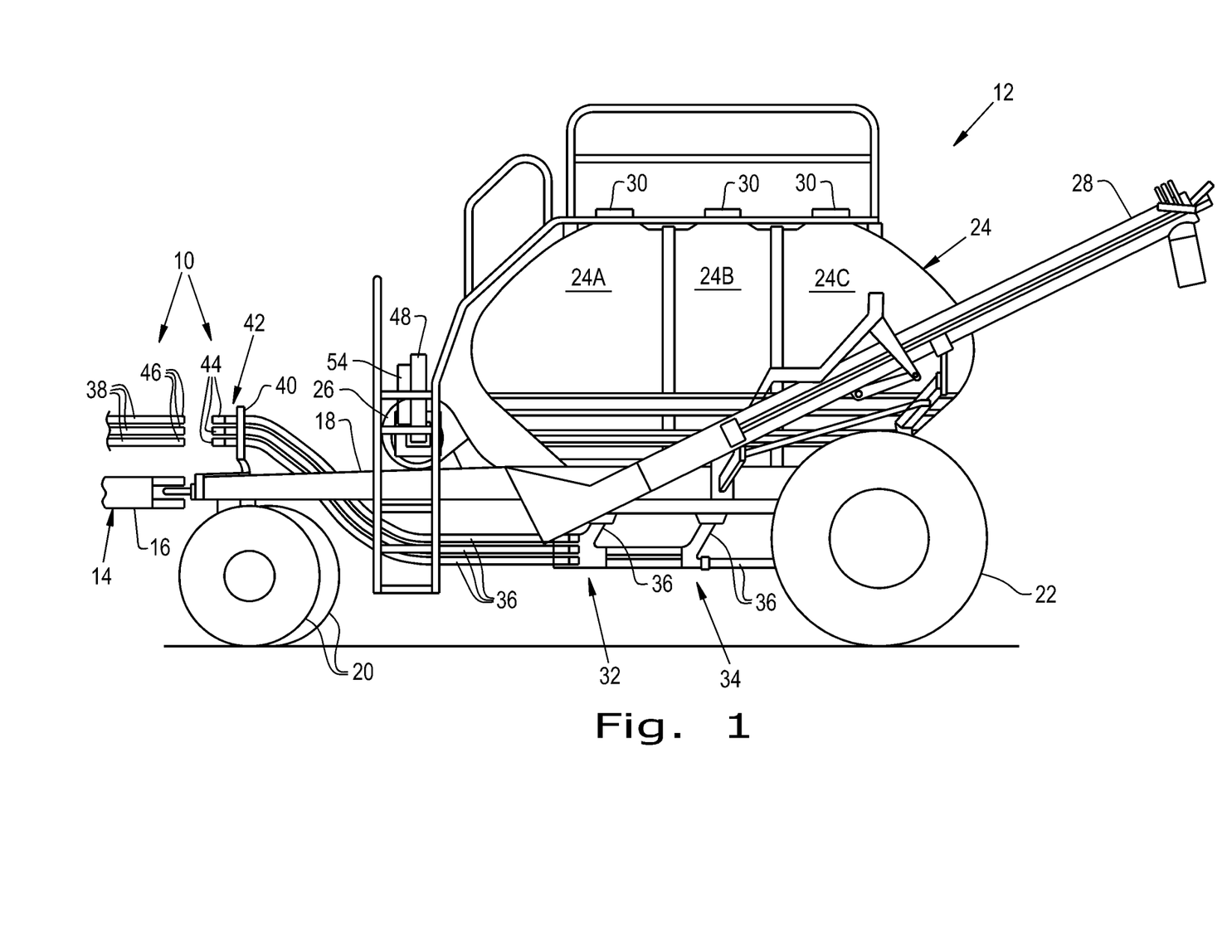
FIG. 1 is a side view of an embodiment of an agricultural vehicle, shown in the form of an air cart, formed according to the present invention.

Referring now to FIG. 1, there is shown an illustration of a portion of an exemplary agricultural seeding or fertilizing system 10 according to the present invention. Agricultural seeding or fertilizing system 10 generally includes an agricultural vehicle 12, shown in the form of an air cart 12, and a tilling implement 14 (with only the rear hitch 16 of tilling implement 14 shown). Air cart 12 may also be configured with a rear hitch (not shown) allowing air cart 12 to be towed in front of, rather than behind, tilling implement 14.

Air cart 12 generally includes a chassis 18 which carries steerable front wheels 20, rear wheels 22, tank 24, blower fan arrangement 26, and auger 28. Tank 24 is illustrated as a multi-compartment tank with internal divider walls (not shown) separating the compartments. In the embodiment shown, tank 24 has three compartments 24A, 24B and 24C with each compartment containing a material to be deposited into the soil (such as seed, fertilizer, herbicide and/or insecticide). Each compartment 24A, 24B and 24C has a top hatch 30 allowing loading of the material therein. In other embodiments not shown, air cart 12 may include multiple tanks 24.

Air cart 12 further includes a pneumatic distribution system 32 for delivering the agricultural material to the trenches in the soil formed by tilling implement 14. Pneumatic distribution system 32 includes a metering system 34 (not specifically shown in FIG. 1), blower fan arrangement 26, and a plurality of air lines 36. In the illustrated embodiment, three primary air lines 36 are shown, one from each tank compartment 24A, 24B and 24C. However, the number of air lines 36 can vary, depending upon the application.

Air lines 36 extend to and terminate at a convenient location for coupling with air lines 38 associated with tilling implement 14. In the embodiment shown, air lines 36 are supported at the forward end of air cart 12 with a support yoke 40. Each air line 36 terminates at a respective fluid (air) line connection 42. In the embodiment shown, each fluid line connection 42 includes a female connector 44 associated with each air line 36 and a male connector 46 associated with an end of each air line 38. However, the orientation of each fluid line connection 42 may be reversed such that each female connector 44 is associated with a corresponding air line 38 of tilling implement 14. Each male connector 46 is received within and fluidly seals with a respective female connector 44.

Figure 2:
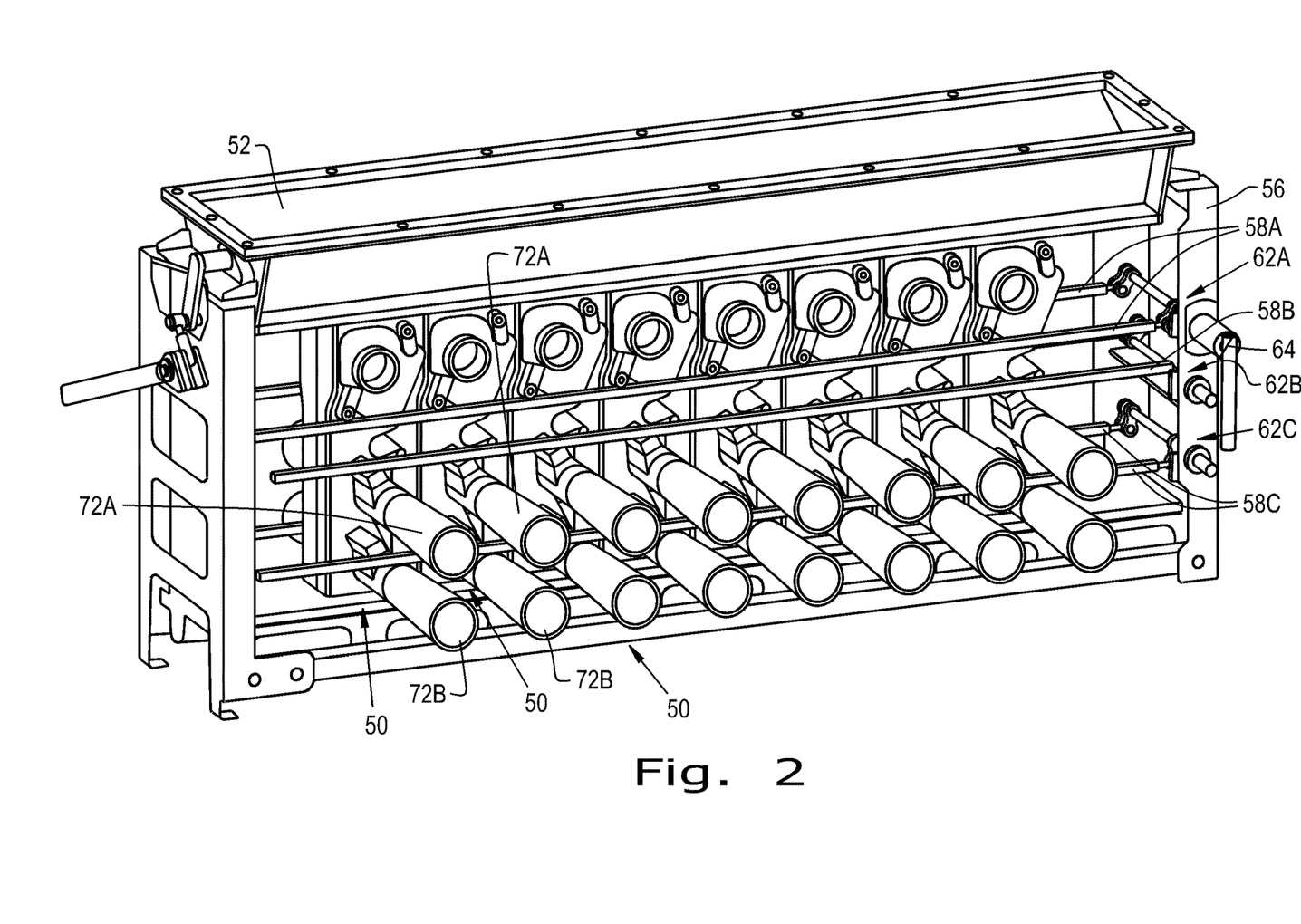
FIG. 2 is a perspective view of a metering system of the air cart shown in FIG. 1.

Referring now to FIG. 2, the metering system 34 is shown in more detail and generally includes a plurality of meter modules 50 which can receive material from the tank 24 via a hopper 52 between the tank 24 and the meter modules 50. The meter modules 50 and hopper 52 can all be connected to and supported by a metering frame 56 carried by the chassis 18. As can be seen, the metering system 34 also includes a plurality of control rods 58A, 58B, 58C connected to respective gates 60A, 60B, 60C (shown in FIG. 3) of the meter modules 50, as will be described further herein. The plurality of control rods 58A, 58B, 58C can include first control rods 58A, second control rods 58B, and third control rods 58C, with each of the control rods 58A, 58B, 58C connecting to a respective control rod linkage 62A, 62B, 62C pivotably connected to the metering frame 56. Each control rod linkage 62A, 62B, 62C can be engaged by a control handle 64, which may be referred to as a user interface, to cause movement of the respectively connected control rods 58A, 58B, 58C and adjust an open state of the respectively connected gates 60A, 60B, 60C. As shown in FIG. 2, the control handle 64 is connected to the control rod linkage 62A and may be rotated by an operator to rotate the first control rods 58A to open or close the respectively connected gates 60A. The control handle 64 may be removably coupled to the control rod linkages 62A, 62B, 62C so an operator may slide the control handle 64 onto a desired control rod linkage, rotate the control handle 64 to change the open state of the gates 60A, 60B, 60C connected to the control rod linkage 62A, 62B, 62C by the respective control rod 58A, 58B, 58C, and then slide the control handle 64 off the control rod linkage 62A, 62B, 62C to engage another control rod linkage 62A, 62B, 62C, if desired.

Figure 3A:
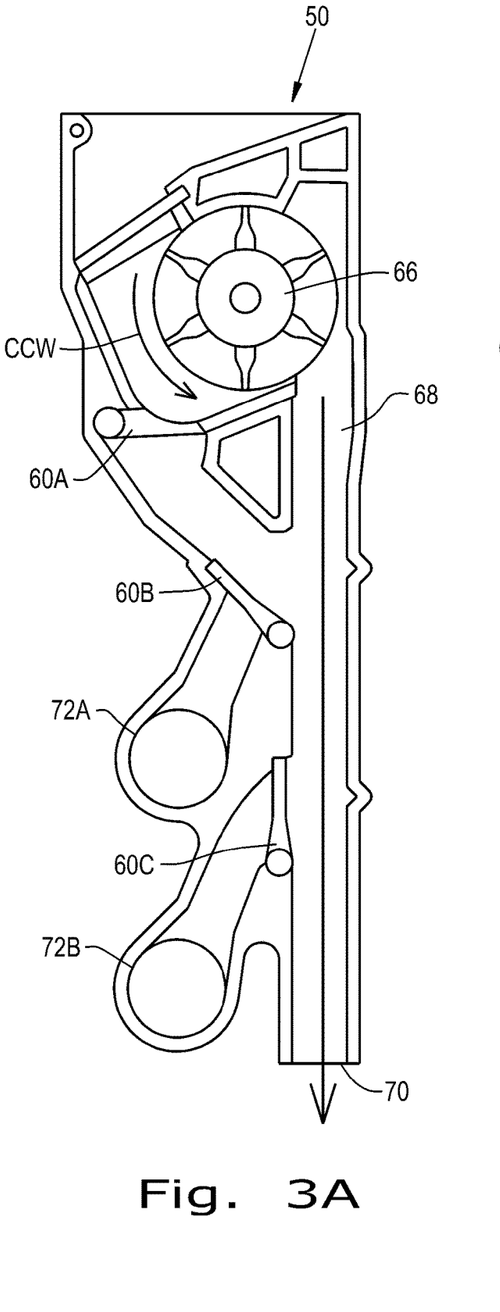
FIG. 3A is a first sectional view of a meter module of the metering system shown in FIGS. 1-2.
Figure 3B:
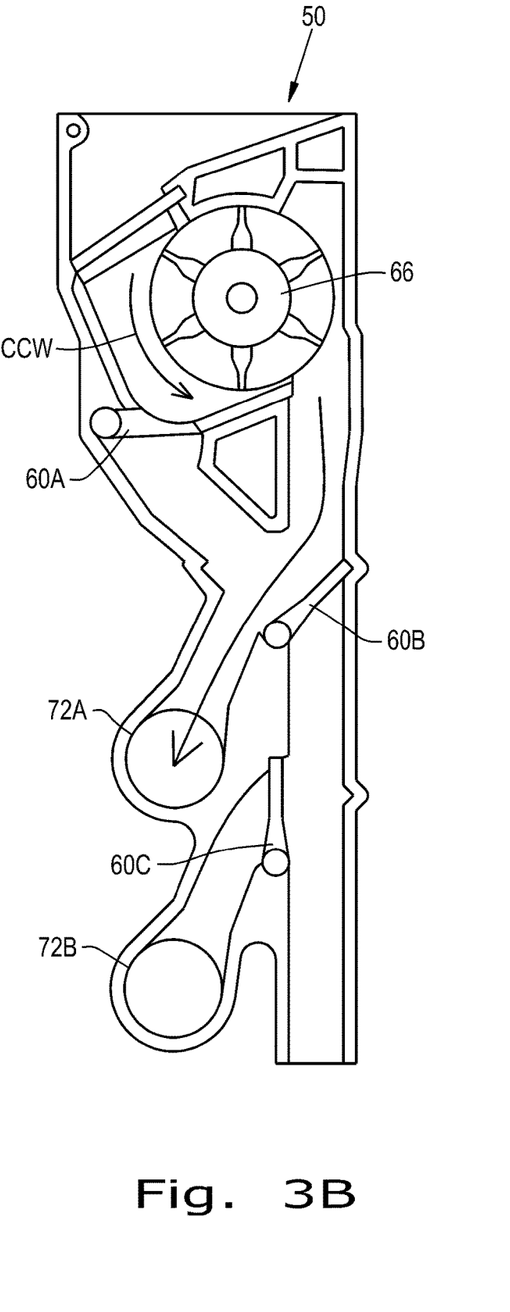
FIG. 3B is a second sectional view of the meter module shown in FIG. 3A with an opened second gate.

Referring now to FIGS. 3A and 3B, a cross-sectional view of one of the meter modules 50 is shown. As can be seen, the meter module 50 includes a metering wheel 66 which can rotate to distribute material, such as seed, fertilizer, herbicide, etc., through the meter module 50. Referring specifically now to FIG. 3A, the metering wheel 66 can rotate in a counter-clockwise direction, indicated by arrow CCW, so material carried by the metering wheel 66 passes by a first gate 60A into a distribution channel 68 of the meter module 50. Since a second gate 60B and third gate 60C shown in FIG. 3A are also in the closed position, the material from the metering wheel 66 will exit the meter module 50 through an ungated outlet 70 and land on the ground below the agricultural vehicle 10 or, alternatively, a trough (not shown) placed below the meter module 50. Referring specifically now to FIG. 3B, it can be seen that the second gate 60B has been moved from its closed position, shown in FIG. 3A, to its open position so material from the metering wheel 66 will enter the distribution channel 68 and be directed by the open second gate 60B to an associated first airstream outlet 72A for distribution. Similarly, the third gate 60C can be associated with a second airstream outlet 72B so when the third gate 60C is open and the first and second gates 60A, 60B are closed, material from the metering wheel 66 will exit out the second airstream outlet 72B.

Figure 4:
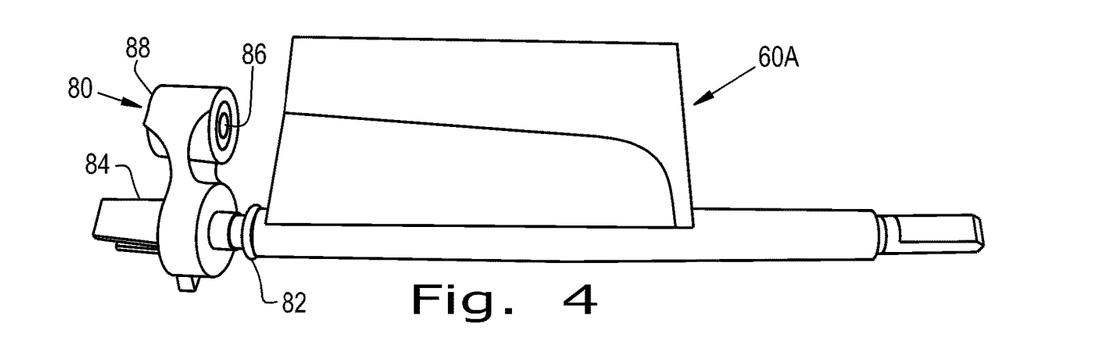
FIG. 4 is a side view of a gate of the meter module shown in FIG. 3 connected to a gate control link.
Figure 5:
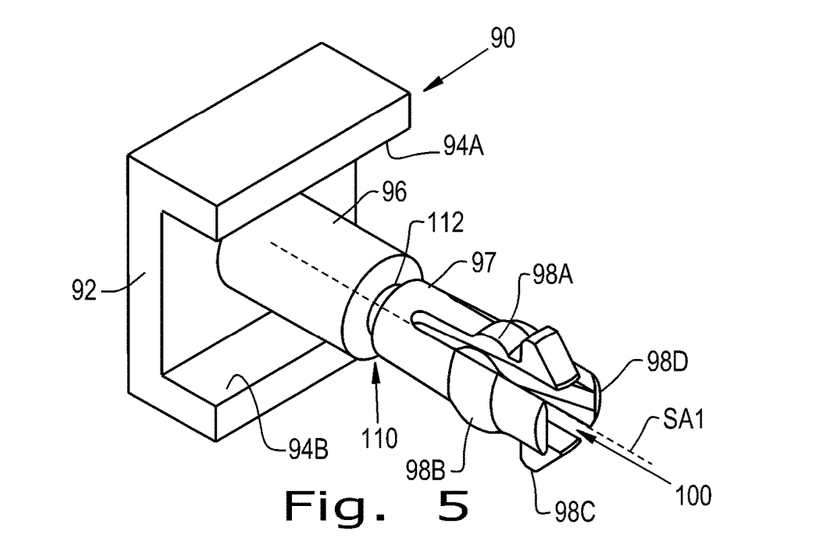
FIG. 5 is a perspective view of an embodiment of a connector formed according to the present invention for connecting the gate control link shown in FIG. 4 to a control rod.
Figure 6:
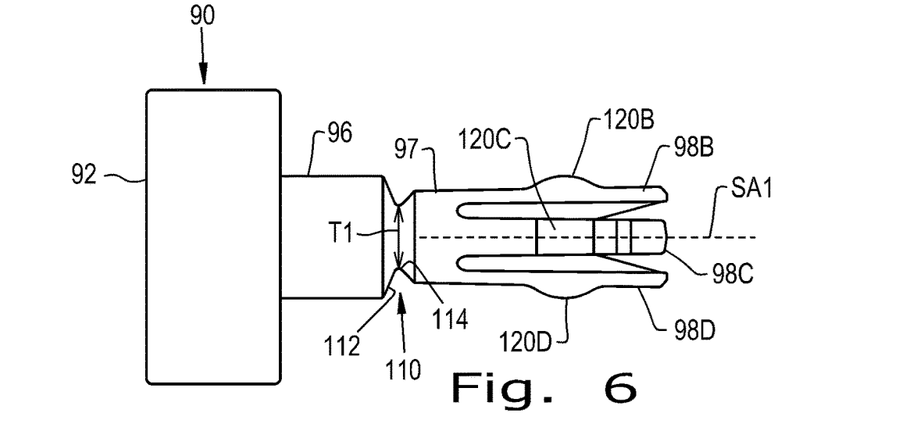
FIG. 6 is a side view of the connector shown in FIG. 5.
Figure 7:
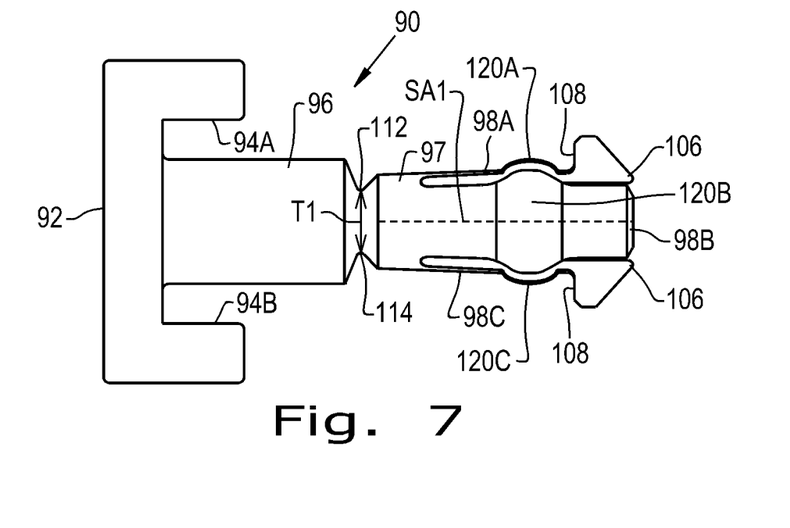
FIG. 7 is another side view of the connector shown in FIGS. 5-6.
Figure 8:
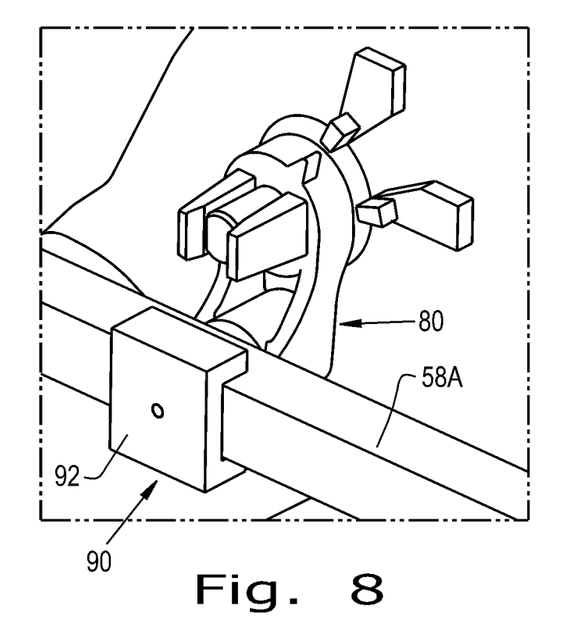
FIG. 8 is a perspective view of the connector shown in FIGS. 5-7 coupling a gate control link to a control rod of the agricultural vehicle.

Referring now to FIG. 4, an exemplary embodiment of a gate control link 80 formed according to the present invention is shown connected to a gate axle 82 of a first gate 60A to control the open state of the first gate 60A. As can be seen, the gate control link 80 includes an axle opening 84 in which the gate axle 82 is placed. The gate axle 82 can be held tightly within the axle opening 84 so rotation of the gate control link 80 will cause a corresponding rotation of the gate axle 82 and first gate 60A, opening or closing the first gate 60A within the meter module 50. The gate control link 80 can also include a link connection opening 86 formed in a link surface 88 for connecting to one of the first control rods 58A, as will be described further herein.

Referring now to FIGS. 5-12, an exemplary embodiment of a connector 90 formed according to the present invention is shown which connects the first control rod 58A to the gate control link 80 at a connection interface CI1 (shown in FIGS. 9-12), and thus connects movement of the first control rod 58A to the first gate 60A. It should be appreciated that while the connector 90 is shown and described herein as connecting the first control rod 58A to the gate control link 80 and first gate 60A, the connector 90 can also be used to connect the second and third control rods 58B, 58C to a gate control link 80 coupled to the second and third gates 60B, 60C, respectively, to control the open state of the second and third gates 60B, 60C by movement of the respective control rods 58B, 58C. The connector 90 can include a head 92 with a pair of retention surfaces 94A, 94B extending therefrom and a connector post 96 extending from the head 92. As can be seen, the connector post 96 can be connected to an insertion portion 97 including two or more legs, shown as four legs 98A, 98B, 98C, 98D, formed with a split 100 between the legs 98A, 98B, 98C, 98D so the legs 98A, 98B, 98C, 98D can be compressed toward one another, allowing the legs 98A, 98B, 98C, 98D to compress and pass through a rod connection opening 102 formed in a rod surface 104 of the first control rod 58A and the link connection opening 86 of the gate control link 80 to connect the gate control link 80 and first gate 60A to the first control rod 58A. As shown herein, the insertion portion 97 can have a smaller diameter than the connector post 96.

The connector 90 includes a frangible portion 110 which is adjacent to the connection interface CI1 between the first control rod 58A and the gate control link 80. As used herein, the frangible portion 110 is "adjacent" to the connection interface CI1 in the sense that the frangible portion 110 will tend to be subjected to shear forces that occur at the connection interface CI1 due to relative freedom between the first control rod 58A and the gate control link 80 at the connection interface CI1. In this respect, the connection interface CI1 can be defined as a shear plane, with an axis in the connection interface CI being illustrated in FIGS. 9-12 for ease of illustration, when the gate control link 80 is stuck, due to obstruction of the first gate 60A or otherwise, and a force is acting on the first control rod 58A, or vice versa. By having the frangible portion 110 of the connector 90 adjacent to the shear plane defined by the connection interface CI1, the frangible portion 110 can break upon a sufficient breaking force, illustrated as arrow BF in FIG. 12, acting on the frangible portion 110. For example, the breaking force BF can cause the frangible portion 110 to first bend, as shown in FIG. 11, and ultimately separate so the gate control link 80 and first control rod 58A uncouple from one another, as shown in FIG. 12.

Figure 9:
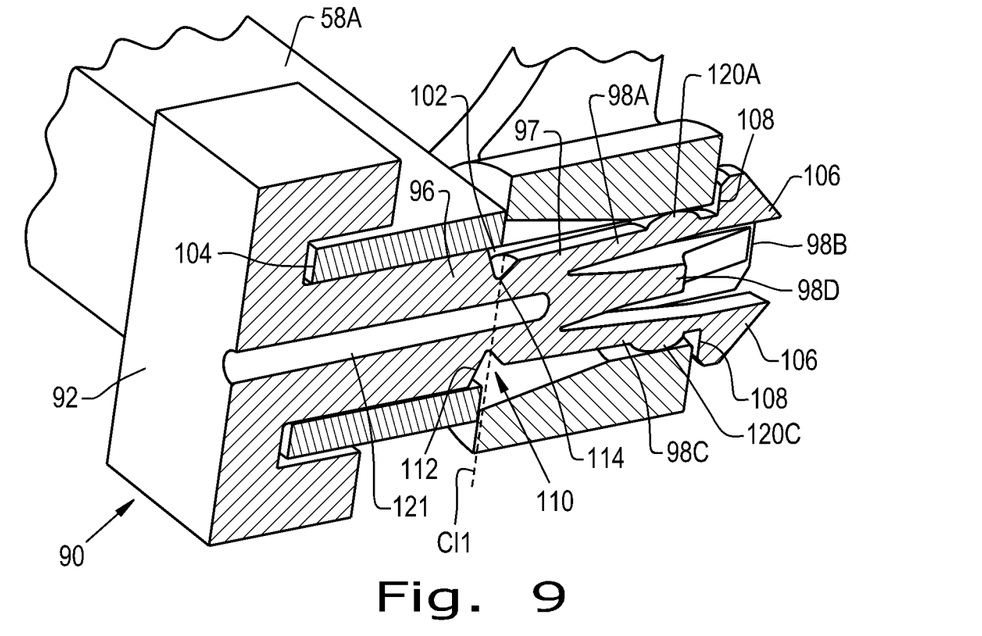
FIG. 9 is a cross-sectional view of the connector shown in FIG. 8.
Figure 10:
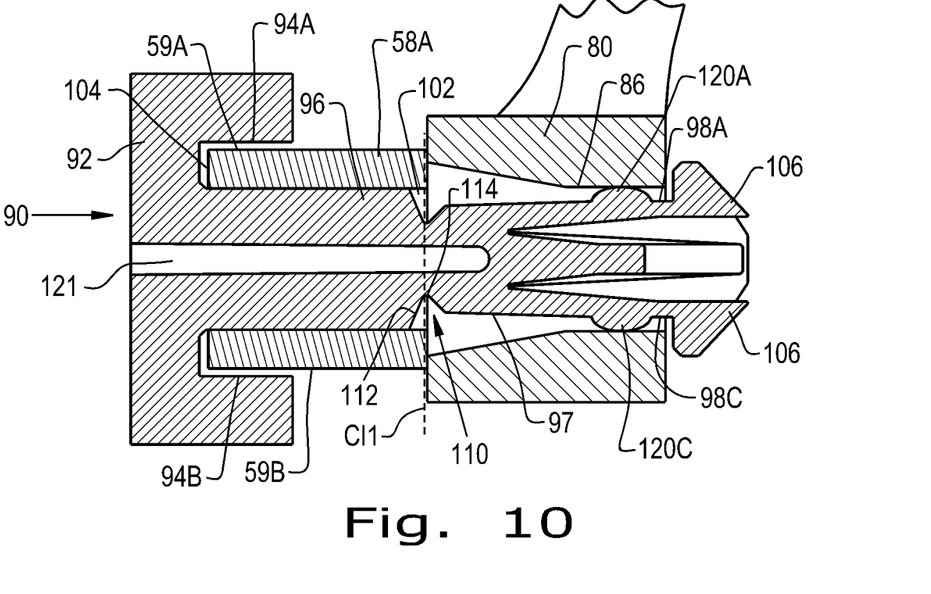
FIG. 10 is another cross-sectional view of the connector shown in FIG. 8.
Figure 11:
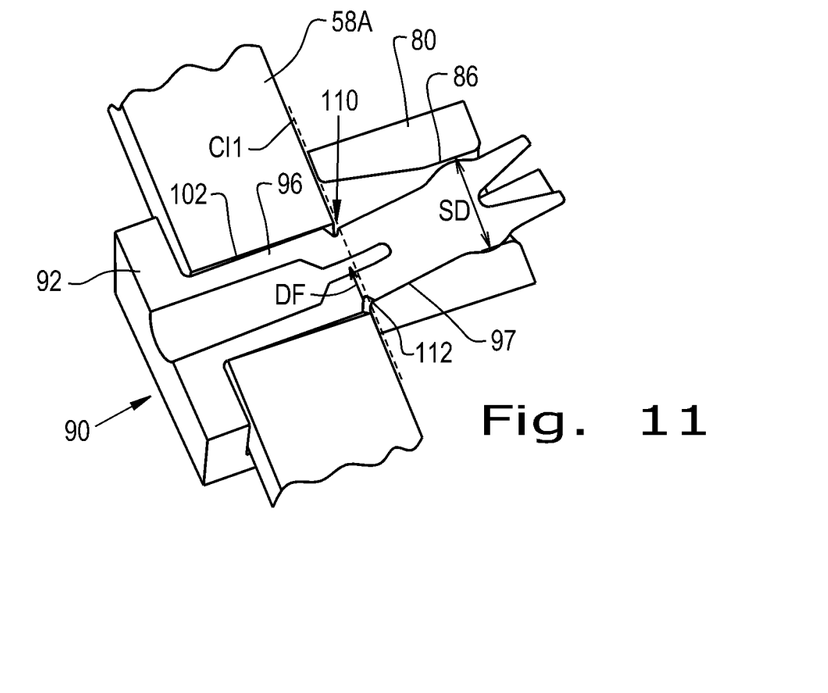
FIG. 11 is a cross-sectional view of the connector shown in FIGS. 8-10 after a breaking force has caused a frangible portion of the connector to bend.
Figure 12:
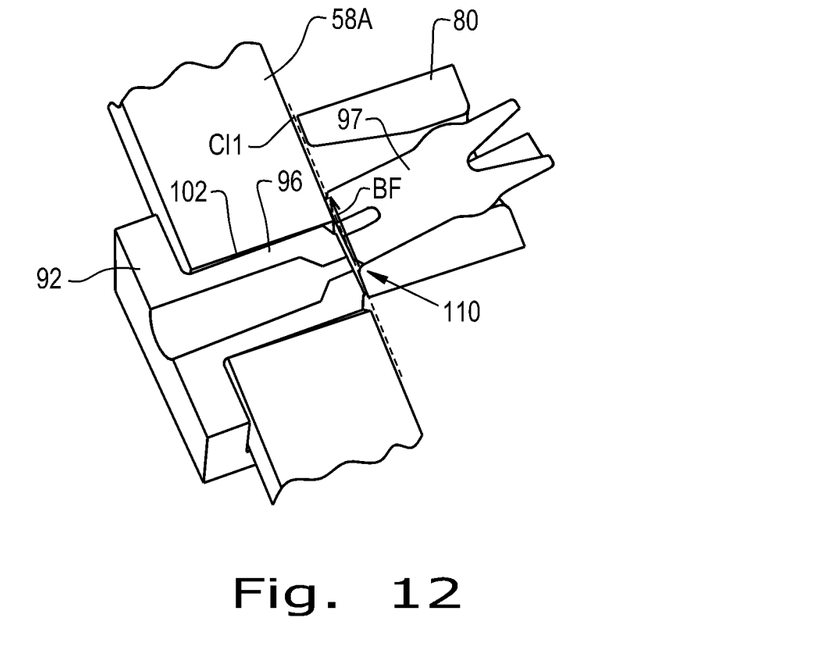
FIG. 12 is a cross-sectional view of the connector shown in FIG. 11 after the breaking force has caused the frangible portion to break, uncoupling the gate control link from the control rod.
Figure 13:
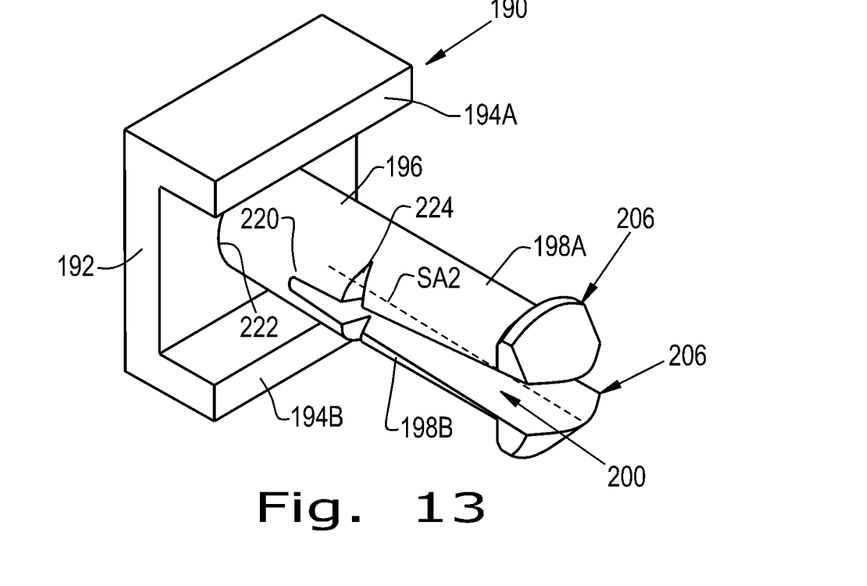
FIG. 13 is a perspective view of an alternative embodiment of a connector formed according to the present invention for connecting the gate control link shown in FIG. 4 to a control rod.
Figure 14:
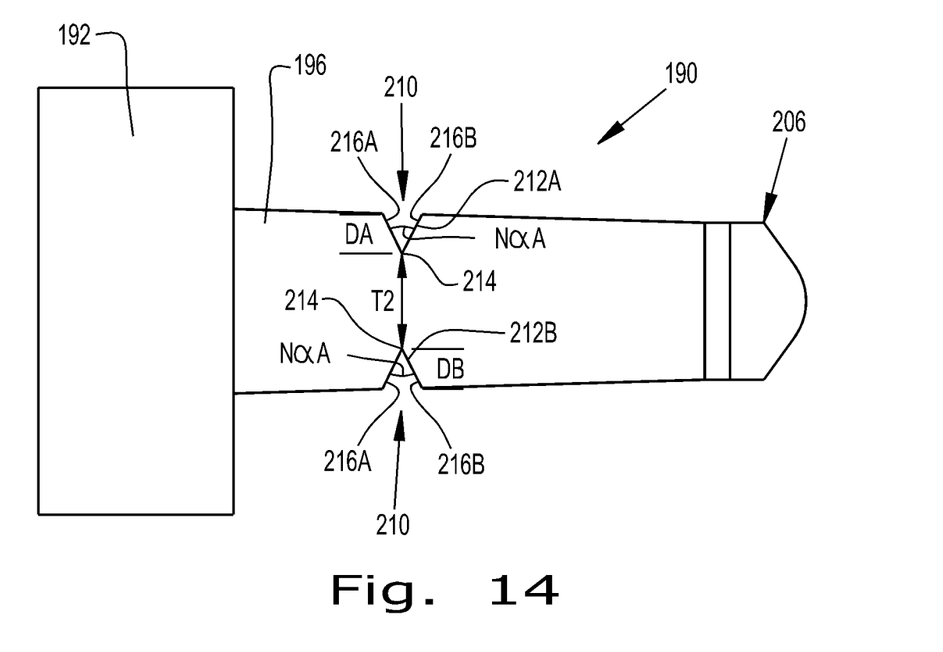
FIG. 14 is a side view of the connector shown in FIG. 13.
Figure 15:
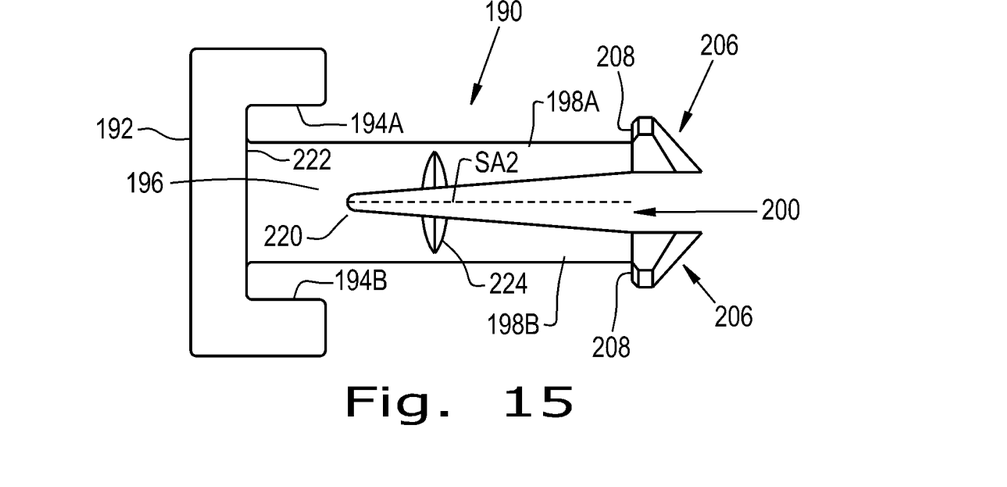
FIG. 15 is another side view of the connector shown in FIGS. 13-14.
Figure 16:
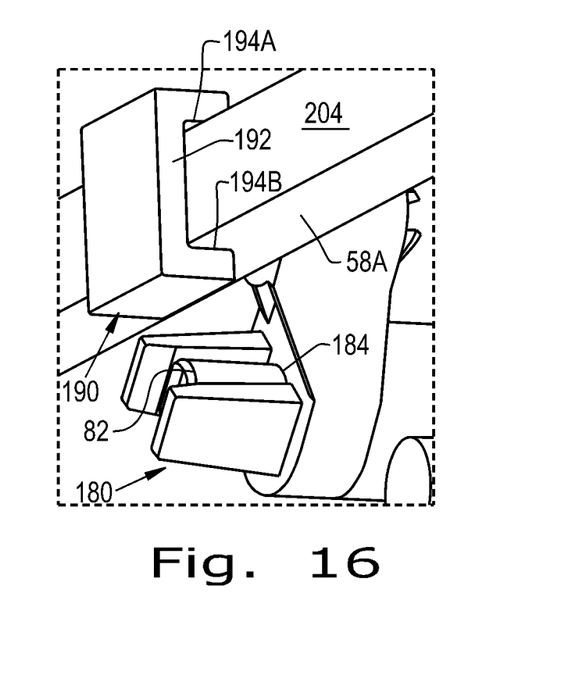
FIG. 16 is a perspective view of the connector shown in FIGS. 13-15 coupling a gate control link to a control rod of the agricultural vehicle.
Figure 17:
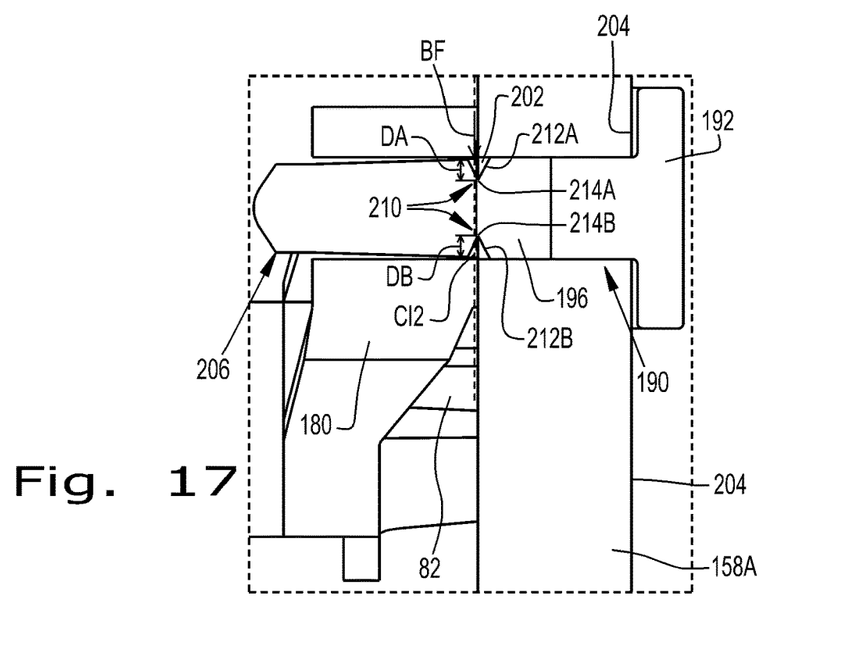
FIG. 17 is a cross-sectional view of the connector shown in FIG. 16.
Figure 18:
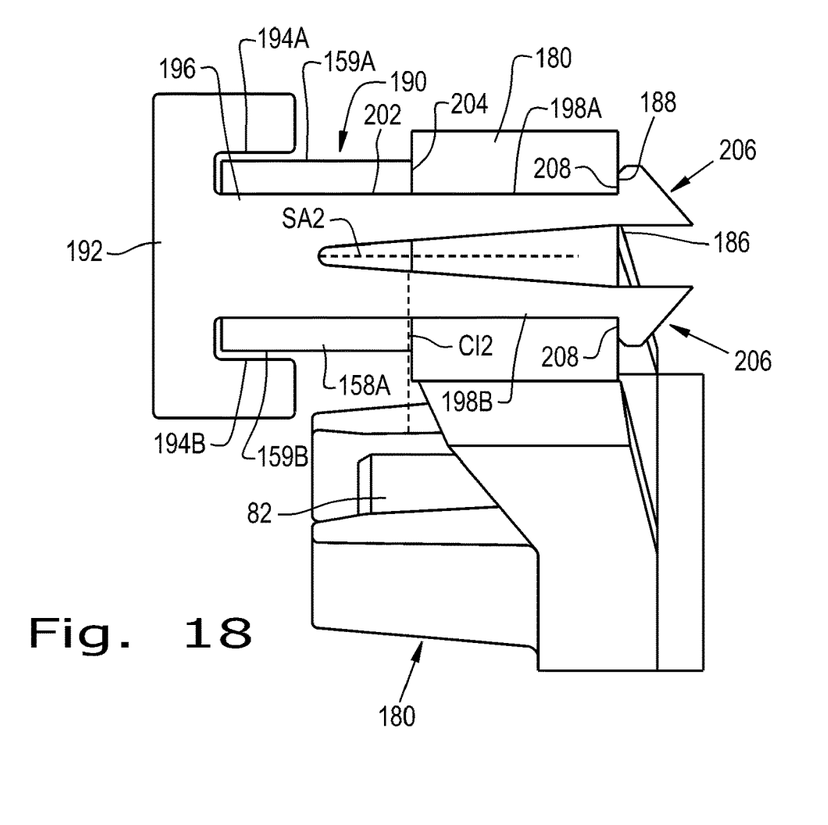
FIG. 18 is another cross-sectional view of the connector shown in FIG. 16.

The frangible portion 110, as shown, can include one or more notches, shown as one notch 112 in FIGS. 5-12, which reside in the shear plane defined by the connection interface CI1. As shown, the notch 112 can be formed as a circumferential notch between the connector post 96 and the insertion portion 97. As can be seen in FIGS. 9-10, the notch 112 can have a bottom 114 which is aligned with the connection interface CI1 and represents a weak point of the connector 90 due to a material thickness T1 of the connector 90 being relatively small at the notch 112 and the bottom 114 being subjected to the brunt of the shear force acting through the shear plane defined by the connection interface CI1. The material thickness T1 of the frangible portion 110 at the notch 112 can be altered, as desired, to control the breaking force BF which is necessary to cause the frangible portion 110 to break and cause the control rod 58A and gate control link 80 to uncouple from one another. The material thickness T1 of the frangible portion 110 at the notch 112 can be adjusted, for example, so a breaking force required to bend and break the frangible portion 110 is smaller than a force that would cause damage to the connected control rod and gate. In other words, the frangible portion 110 can be configured to break due to a breaking force BF which is smaller than a force that would cause damage to the connected control rod and gate. The connector 90 can also include a bore 121 (shown in FIGS. 9-12) formed between the connector post 96 and the insertion portion 97 to further weaken the frangible portion 110, if desired, and reduce the breaking force required to break the frangible portion 110.

The connector 90, therefore, can act as a fuse of the metering system 34 and protect the relatively difficult-to-replace gates 60A, 60B, 60C, gate control links 80, and control rods 58A, 58B, 58C from breaking due to shear force that occurs when moving the control rods 58A, 58B, 58C to change the open state of the respectively connected gates 60A, 60B, 60C. To make replacement of the connector 90 fairly economical, the connector 90 can comprise, for example, a polymer such as a resin and be formed by injection molding. Forming the connector 90 by injection molding of a resin, such as a glass fill reinforced nylon, can allow for the mass production of the connector 90 at a relatively economical price, allowing an operator to economically keep replacement connectors 90 on hand in the event that an installed connector 90 breaks. It should be appreciated that while the previously described frangible portion 110 includes one notch 112A, the frangible portion 110 can be formed with more than one notch, as will be described further herein. Alternatively, the frangible portion 110 can be formed of a weaker material than the rest of the connector 90, such as a lower strength polymer, so the frangible portion 110 is more prone to breakage than the rest of the connector 90. The frangible portion 110 can be weakened, relative to the rest of the connector 90, in many other ways so that the frangible portion 110 being placed adjacent to the connection interface CI1 will tend to cause the frangible portion 110 to act as a fuse, and the foregoing examples of the frangible portion 110 should not be construed as limiting the present invention to any particular frangible portion configuration.

To assist with proper placement of the connector 90 during initial placement or replacement, two or more of the legs 98A, 98C can include a hooked insertion end 106 which is tapered and has a shoulder 108 which can abut against the link surface 88 to prevent the connector 90 from being pulled back out of the link connection opening 86 and rod connection opening 102. To couple the control rod 58A and gate control link 80 with the shown connector 90, the hooked insertion ends 106 can be pushed through the aligned link connection opening 86 and rod connection opening 102, with the legs 98A, 98B, 98C, 98D compressing toward one another as the connector 90 is pushed through, until the hooked insertion ends 106 are fully through the link connection opening 86 and "snap" out, producing an audible and/or tactile indication to the operator that the connector 90 is in place and allowing connection of the control rod 58A and gate control link 80 without requiring any tools. The head 92 of the connector 90 abutting against the rod surface 104 can prevent the connector 90 from being pushed through the rod connection opening 102 and the link connection opening 86, keeping the connector 90 in place. The previously described retention surfaces 94A, 94B can be placed adjacent to opposite surfaces 59A, 59B of the control rod 58A to both align placement of the connector post 96 within the rod connection opening 102 and limit relative bending of the head 92 and connector post 96 near the rod connection opening 102. While the head 92 is shown as having a pair of retention surfaces 94A, 94B, the head 92 may only include one retention surface or more than two retention surfaces, if desired. The split 100 can define a split axis SA1 therethrough, and the connector 90 can include one or more protrusions 120A, 120B, 120C, 120D extending from the insertion portion 97 orthogonally to the split axis SA. As shown, each of the legs 98A, 98B, 98C, 98D has a respective protrusion 120A, 120B, 120C, 120D orthogonally extending therefrom which can be rounded.

Referring now to FIG. 11, the connector 90 is shown after being subjected to a bending force, represented by arrow DF, which is sufficient to cause the connector 90 to bend at the frangible portion 110 without breaking. As can be seen, the frangible portion 110 will tend to be where bending of the connector 90 occurs due to being adjacent to the connection interface CI1 as well as having the notch 112 concentrate stress in the frangible portion 110. To allow for the connector 90 to bend at the frangible portion 110 without the frangible portion 110 breaking, the link connection opening 86 can be formed with a plurality of diameters to allow bending at the frangible portion 110, as shown in FIG. 11. The protrusions 120A, 120B, 120C, 120D of the legs 98A, 98B, 98C, 98D can contact a small diameter SD of the link connection opening 86 so the bending force DF can transmit to the frangible portion 110 and bend the frangible portion 110. If the force acting on the protrusions 120A, 120B, 120C, 120D of the legs 98A, 98B, 98C, 98D is sufficiently high, such as the breaking force BF shown in FIG. 12, the frangible portion 110 will bend and break, uncoupling the control rod 58A and gate control link 80 so the force does not transmit to connected gate 60A.

If the connector 90 breaks, as shown in FIG. 12, replacement is fairly simple and straightforward. An operator can pull the head 92 of the connector 90 away from the control rod 58A, if vibration of the vehicle 10 has not dislodged the head 92, so the rod connection opening 102 is not filled. The operator may then take a replacement connector 90, and push the hooked insertion ends 106 into the rod connection opening 102. As the hooked insertion ends 106 are pushed into the rod connection opening 102, past the connection interface CI1, and into the link connection opening 86, the hooked insertion ends 106 can push any remnants of the broken connector out of the link connection opening 86. Once the replacement connector 90 is properly pushed through the link connection opening 86 and the rod connection opening 102 so the shoulders 108 are out of the link connection opening 86, the legs 98A, 98B, 98C, 98D of the insertion portion 97 can snap out to indicate to the operator that the gate control link 80 and control rod 58A are coupled together. It should be appreciated that while the previously described and shown connector 90 has the head 92 abutting against the control rod 58A and the shoulder 108 adjacent the gate control link 80, this configuration can be reversed, if desired.

Referring now to FIGS. 13-19, another exemplary embodiment of a connector 190 formed according to the present invention is shown which connects a control rod 158A to a gate control link 180 at a connection interface CI2, and thus connects movement of the control rod 158A to a respectively connected gate, such as first gate 60A. It should be appreciated that elements shown in FIGS. 13-19 which are similar to elements shown in FIGS. 2-12 are assigned a similar reference numeral raised by 100. The connector 190 can include a head 192 with a pair of retention surfaces 194A, 194B extending therefrom and a connector post 196 extending from the head 192. As can be seen, the connector post 196 can include two or more legs, shown as two legs 198A and 198B formed with a split 200 between the legs 198A, 198B so the legs 198A, 198B can be compressed toward one another, allowing the legs 198A, 198B to compress and pass through a rod connection opening 202 formed in a rod surface 204 of the control rod 158A and a link connection opening 186 of the gate control link 180 to connect the gate control link 180 and first gate 60A to the control rod 158A.

Figure 19:
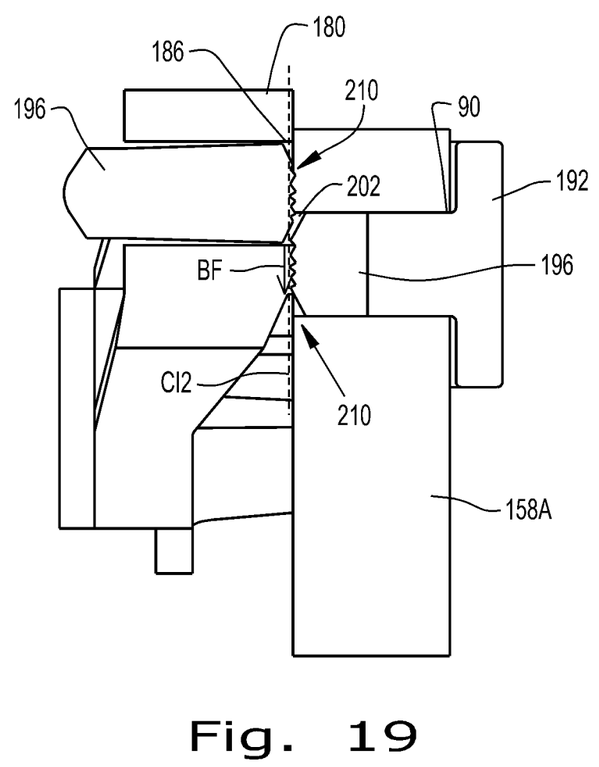
FIG. 19 is a cross-sectional view of the connector shown in FIGS. 16-18 after a breaking force has caused a frangible portion of the connector to break, uncoupling the gate control link from the control rod.

The connector 190 includes a frangible portion 210 which is adjacent to the connection interface CI2 between the control rod 158A and the gate control link 180, similarly to the previously described frangible portion 110, so the frangible portion 210 can break upon a sufficient breaking force, illustrated as arrow BF in FIG. 19, acting on the frangible portion 210, which causes the frangible portion 210 to separate and the gate control link 180 and control rod 158A to uncouple from one another. The frangible portion 210, as shown, can include two or more notches 212A, 212B formed in the connector post 196 which reside in the shear plane defined by the connection interface CI2. As shown, each notch 212A, 212B can be formed in one of the respective legs 198A, 198B of the connector post 196. The notches 212A, 212B can each have a bottom 214A, 214B at a respective depth DA, DB of the notches 212A, 212B which is aligned with the connection interface CI2 and together represent a weak point of the connector post 196 due to a material thickness T2 of the connector post 196 being relatively small between the bottoms 214A, 214B of the notches 212A, 212B and the bottoms 214A, 214B being subjected to the brunt of the shear force acting through the shear plane defined by the connection interface CI2. Each notch 212A, 212B can be defined by a respective pair of sidewalls 216A, 216B which intersect at the respective bottoms 214A, 214B and together define a notch angle NαA, NαB of the notches 212A, 212B. The depths DA, DB and notch angles NαA, NαB of the notches 212A, 212B can be altered, as desired, to control the breaking force BF which is necessary to cause the frangible portion 210 to break and cause the control rod 158A and gate control link 180 to uncouple from one another.

To assist with proper placement of the connector 190 during initial placement or replacement, each of the legs 198A, 198B can include a hooked insertion end 206 which is tapered and has a shoulder 208 which can abut against a link surface 188 of the gate control link 180 to prevent the connector 190 from being pulled back out of the link connection opening 186 and rod connection opening 202. To couple the control rod 158A and gate control link 180 with the shown connector 190, the hooked insertion ends 206 can be pushed through the aligned link connection opening 186 and rod connection opening 202, with the legs 198A, 198B compressing toward one another as the connector 190 is pushed through, until the hooked insertion ends 206 are fully through the link connection opening 186 and "snap" out, producing an audible and/or tactile indication to the operator that the connector 190 is in place and allowing connection of the control rod 158A and gate control link 180 without requiring any tools. The head 192 of the connector 190 abutting against the rod surface 204 can prevent the connector 190 from being pushed through the rod connection opening 202 and the link connection opening 186, keeping the connector 190 in place. The previously described retention surfaces 194A, 194B can be placed adjacent to opposite surfaces 159A, 159B of the control rod 158A to both align placement of the connector post 196 within the rod connection opening 202 and limit relative bending of the head 192 near the rod connection opening 202. While the head 192 is shown as having a pair of retention surfaces 194A, 194B, the head 192 may only include one retention surface or more than two retention surfaces, if desired. The split 200 can define a split axis SA2 therethrough, and the connector 190 can include a protrusion 220 extending from the connector post 196 orthogonally to the split axis SA2. Since the legs 198A, 198B, as shown, compress toward the split axis SA2 when compressed toward one another, having the protrusion 220 extend orthogonally to the split axis SA2 can act as a stop for the connector 190 so the connector 190 is not overly pushed through the aligned link connection opening 186 and rod connection opening 202. The protrusion 220 can, for example, have a first end 222 which connects to the head 192 and a second end 224 that terminates at the frangible portion 210, such as at the notches 212A, 212B, so the frangible portion 210 stays adjacent to the connection interface CI2 during operation.

If the connector 190 breaks, as shown in FIG. 19, replacement is fairly simple and straightforward. An operator can pull the head 192 of the connector 190 away from the control rod 158A, if vibration of the vehicle 10 has not dislodged the head 192, so the rod connection opening 202 is not filled. The operator may then take a replacement connector 190, and push the hooked insertion ends 206 into the rod connection opening 202. As the hooked insertion ends 206 are pushed into the rod connection opening 202, past the connection interface CI2, and into the link connection opening 186, the hooked insertion ends 206 can push any remnants of the broken connector out of the link connection opening 186. Once the replacement connector 190 is properly pushed through the link connection opening 186 and the rod connection opening 202 so the shoulder 208 is out of the link connection opening 186, the legs 198A, 198B of the connector post 196 can snap out to indicate to the operator that the gate control link 180 and control rod 158A are coupled together. It should be appreciated that while the previously described and shown connector 190 has the head 192 abutting against the control rod 158A and the shoulder 208 adjacent the gate control link 180, this configuration can be reversed, if desired.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A metering system for an agricultural vehicle, comprising:
    at least one meter module having at least one gate;
    a gate control link coupled with said at least one gate of said at least one meter module;
    a control rod; and
    a connector coupling said control rod to said gate control link at a connection interface such that movement of said control rod controls an open state of said at least one gate of said at least one meter module, said connector having a frangible portion adjacent said connection interface, wherein said frangible portion includes at least one notch formed therein, said control rod and said gate control link uncoupling from one another upon a breaking force causing said frangible portion to break; wherein said connection interface defines a shear plane and a bottom of said at least one notch is aligned with said shear plane; wherein said connector includes at least two spaced apart legs defining a split therebetween; and wherein said gate control link includes a link surface having a link connection opening formed therein, at least two of said spaced apart legs partially filling said link connection opening and including a hooked insertion end with a shoulder abutting against said link surface.

2. The metering system according to claim 1, wherein said split defines a split axis through said connector, at least one of said legs having a protrusion extending orthogonally relative to said split axis.

3. The metering system according to claim 1, wherein said frangible portion is configured to break due to a breaking force which is smaller than a force that would damage the connected control rod and the at least one gate.

* * * * *